(12) United States Patent
Budnick et al.

(10) Patent No.: US 9,845,695 B2
(45) Date of Patent: Dec. 19, 2017

(54) GAS TURBINE SEAL ASSEMBLY AND SEAL SUPPORT

(71) Applicant: United Technologies Corporation, Hartford, CT (US)

(72) Inventors: Matthew Budnick, Hudson, NH (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 228 days.

(21) Appl. No.: 14/652,715

(22) PCT Filed: Dec. 23, 2013

(86) PCT No.: PCT/US2013/077437
§ 371 (c)(1),
(2) Date: Jun. 16, 2015

(87) PCT Pub. No.: WO2014/105800
PCT Pub. Date: Jul. 3, 2014

(65) Prior Publication Data
US 2015/0315925 A1 Nov. 5, 2015

Related U.S. Application Data

(60) Provisional application No. 61/747,266, filed on Dec. 29, 2012.

(51) Int. Cl.
*F01D 11/00* (2006.01)
*F02C 7/28* (2006.01)
(Continued)

(52) U.S. Cl.
CPC .......... *F01D 11/003* (2013.01); *F01D 11/005* (2013.01); *F01D 25/162* (2013.01);
(Continued)

(58) Field of Classification Search
CPC .... F02C 7/28; F05D 2240/57; F05D 2240/59; F01D 11/001
(Continued)

(56) References Cited

U.S. PATENT DOCUMENTS 2,214,108 A    7/1938   Grece
3,576,328 A    4/1971   Vose
(Continued)

FOREIGN PATENT DOCUMENTS

JP    2004076726 A    3/2004
JP    2004316542 A    11/2004
(Continued)

OTHER PUBLICATIONS

International Search Report and Written Opinion, dated Apr. 28, 2014, for PCT Application No. PCT/US2013/077437, 11 pages.
(Continued)

*Primary Examiner* — Matthew W Jellett
(74) *Attorney, Agent, or Firm* — Kinney & Lange, P.A.

(57) ABSTRACT

A gas turbine engine assembly includes a second module interconnected with a first module along a joint such that a surface of a second radial wall faces a surface of a first radial wall, with a cavity defined in part by the first and second radial walls. A seal assembly includes a finger seal, and a seal support ring having a backing ring portion and a flow discourager arm. The backing ring is secured to one of the first radial wall and the second radial wall, and the flow discourager arm extends axially through the cavity into a recess formed in the other of the first and second radial walls. The finger seal includes a free end contacting an inner side of the flow discourager arm.

18 Claims, 9 Drawing Sheets

(51) Int. Cl.
*F01D 25/16* (2006.01)
*F01D 25/30* (2006.01)
*F01D 25/24* (2006.01)

(52) U.S. Cl.
CPC ........... *F01D 25/246* (2013.01); *F01D 25/30* (2013.01); *F02C 7/28* (2013.01); *F05D 2220/32* (2013.01)

(58) Field of Classification Search
USPC ............. 277/301, 309, 355, 402; 415/173.7, 415/174.2, 174.3, 174.5; 416/174
See application file for complete search history.

(56) References Cited

U.S. PATENT DOCUMENTS

| | | |
|---|---|---|
| 3,736,069 A * | 5/1973 | Beam, Jr. ............... F01D 9/041 137/468 |
| 3,802,046 A | 4/1974 | Wachtell et al. |
| 3,970,319 A | 7/1976 | Carroll et al. |
| 4,009,569 A | 3/1977 | Kozlin |
| 4,023,731 A * | 5/1977 | Patterson ............... F01D 11/18 236/101 R |
| 4,044,555 A | 8/1977 | McLoughlin et al. |
| 4,088,422 A | 5/1978 | Martin |
| 4,114,248 A | 9/1978 | Smith et al. |
| 4,305,697 A | 12/1981 | Cohen et al. |
| 4,321,007 A | 3/1982 | Dennison et al. |
| 4,369,016 A | 1/1983 | Dennison |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,793,770 A | 12/1988 | Schonewald et al. |
| 4,883,405 A | 11/1989 | Walker |
| 4,920,742 A | 5/1990 | Nash et al. |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | VonBenken et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,224,822 A | 7/1993 | Lenahan et al. |
| 5,236,302 A | 8/1993 | Weisgerber et al. |
| 5,246,295 A | 9/1993 | Ide |
| 5,265,807 A | 11/1993 | Steckbeck et al. |
| 5,269,057 A | 12/1993 | Mendham |
| 5,272,869 A | 12/1993 | Dawson et al. |
| 5,273,397 A | 12/1993 | Czachor et al. |
| 5,292,227 A | 3/1994 | Czachor et al. |
| 5,312,227 A | 5/1994 | Grateau et al. |
| 5,338,154 A | 8/1994 | Meade et al. |
| 5,357,744 A | 10/1994 | Czachor et al. |
| 5,370,402 A | 12/1994 | Gardner et al. |
| 5,385,409 A | 1/1995 | Ide |
| 5,401,036 A | 3/1995 | Basu |
| 5,438,756 A | 8/1995 | Halchak et al. |
| 5,474,305 A | 12/1995 | Flower |
| 5,483,792 A | 1/1996 | Czachor et al. |
| 5,558,341 A | 9/1996 | McNickle et al. |
| 5,597,286 A | 1/1997 | Dawson et al. |
| 5,605,438 A | 2/1997 | Burdgick et al. |
| 5,609,467 A | 3/1997 | Lenhart et al. |
| 5,632,493 A | 5/1997 | Gardner |
| 5,634,767 A | 6/1997 | Dawson |
| 5,755,445 A | 5/1998 | Arora |
| 5,851,105 A | 12/1998 | Fric et al. |
| 5,911,400 A | 6/1999 | Niethammer et al. |
| 5,961,279 A | 10/1999 | Ingistov |
| 6,163,959 A | 12/2000 | Arraitz et al. |
| 6,196,550 B1 | 3/2001 | Arora et al. |
| 6,227,800 B1 | 5/2001 | Spring et al. |
| 6,343,912 B1 | 2/2002 | Mangeiga et al. |
| 6,358,001 B1 | 3/2002 | Bosel et al. |
| 6,364,316 B1 | 4/2002 | Arora |
| 6,439,841 B1 | 8/2002 | Bosel |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,612,809 B2 | 9/2003 | Czachor et al. |
| 6,619,030 B1 | 9/2003 | Seda et al. |
| 6,637,751 B2 | 10/2003 | Aksit et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kosel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 | 6/2006 | Baxter et al. |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,527,469 B2 | 5/2009 | Zborovsky et al. |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2003/0161716 A1 | 8/2003 | Nguyen et al. |
| 2005/0046113 A1 | 3/2005 | Inoue |
| 2006/0010852 A1 | 1/2006 | Gekht et al. |
| 2006/0056961 A1 | 3/2006 | Czachor et al. |
| 2008/0216300 A1 | 9/2008 | Anderson et al. |
| 2009/0129916 A1 | 5/2009 | Young et al. |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0202872 A1 | 8/2010 | Weidmann |

(56) References Cited

U.S. PATENT DOCUMENTS

| | | |
|---|---|---|
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0049812 A1 | 3/2011 | Suteu |
| 2011/0061767 A1 | 3/2011 | Vontell et al. |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| JP | 2007120340 A | 5/2007 |
| WO | WO 03/020469 A1 | 3/2003 |
| WO | WO 2006/007686 A1 | 1/2006 |
| WO | WO 2009/157817 A1 | 12/2009 |
| WO | WO 2010/002295 A1 | 1/2010 |
| WO | WO 2012/158070 A1 | 11/2012 |

OTHER PUBLICATIONS

Extended European Search Report for European Application No. 13867264.7, dated Jan. 15, 2016, 8 pages.

Japanese Office Action from Japanese Application No. 2015-550724; dated Aug. 15, 2017; 4 pages.

* cited by examiner

GAS TURBINE SEAL ASSEMBLY AND SEAL SUPPORT

BACKGROUND

The described subject matter relates to gas turbine engines, and more particularly to sealing cavities between gas turbine engine modules.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For ease of assembly, gas turbine engines are typically designed in sections typically called modules. Each section is comprised of various components. The modules are then assembled together at the engine level. W-seals, feather seals, and/or dog-bone seals are typically used between modules to seal the modules against ingesting gas flow from a main gas flow passage of the gas turbine engine. However, these seals utilize a firm contacting interface that imparts a relatively large load on the modules to accomplish sealing. Additionally, seals can be damaged, for example, during engine level assembly when the modules are joined together.

SUMMARY

An assembly for a gas turbine engine comprises a first module, a second module, a cavity, and a seal assembly disposed proximate the cavity. The second module is interconnected with the first module along a joint such that a surface of the second radial wall faces a surface of the first radial wall. A cavity is defined in part by the first and second radial walls. The seal assembly comprises a seal support ring and a first finger seal. The seal support ring includes a backing ring portion and a flow discourager arm. The backing ring is secured to one of the first radial wall and the second radial wall, and the flow discourager arm extends axially through the cavity into a recess formed in the other of the first and second radial walls. The first finger seal includes a free end contacting an inner side of the flow discourager arm.

A turbine assembly for a gas turbine engine comprises a turbine exhaust case (TEC) assembly with a first outer case section, and a second turbine module including a second outer case section interconnected with the first outer case section. The second outer case section is interconnected with the first outer case section such that a surface of a first radial wall faces a surface of a second radial wall. A seal support ring includes a backing ring portion mounted to the first radial wall. A discourager portion extends from the backing ring portion and into a recess formed in the second radial wall for reducing a leakage flow reaching an interconnection of the first outer case and the second outer case. The first finger seal has a free end contacting an inner side of the discourager portion for sealing a fairing cavity.

A seal support for a gas turbine engine comprises means for securing the seal support to a radial wall of a gas turbine module. The seal support further comprises means for discouraging a leakage flow from entering a cavity defined in part by the radial wall. The discouraging means are arranged substantially perpendicular to the securing means.

DETAILED DESCRIPTION

Figure 1:
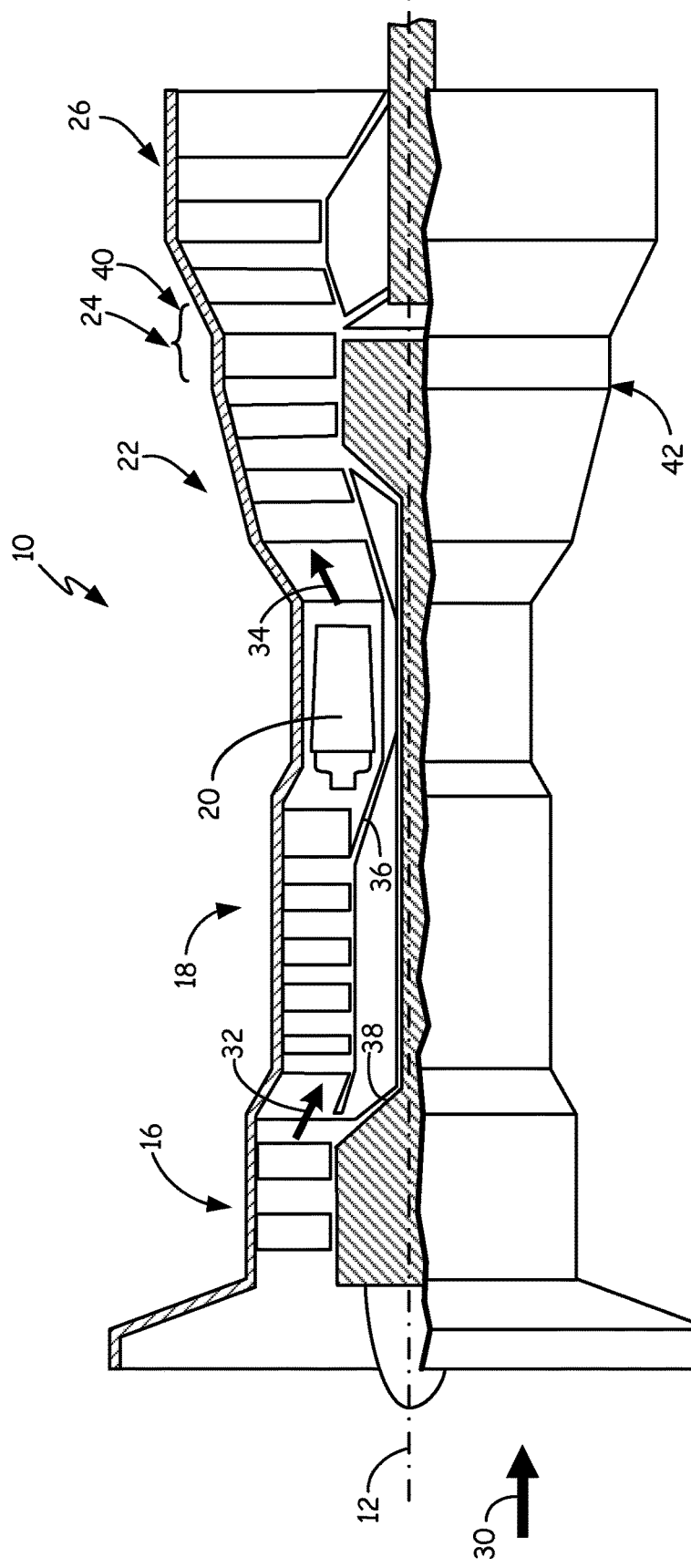
FIG. 1 schematically depicts an example gas turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown). Turbine assembly 40 also includes turbine exhaust case (TEC) assembly 42. As shown in FIG. 1, TEC assembly 42 can be disposed axially between low pressure turbine section 24 and power turbine 26. TEC assembly 42 is described in more detail below.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
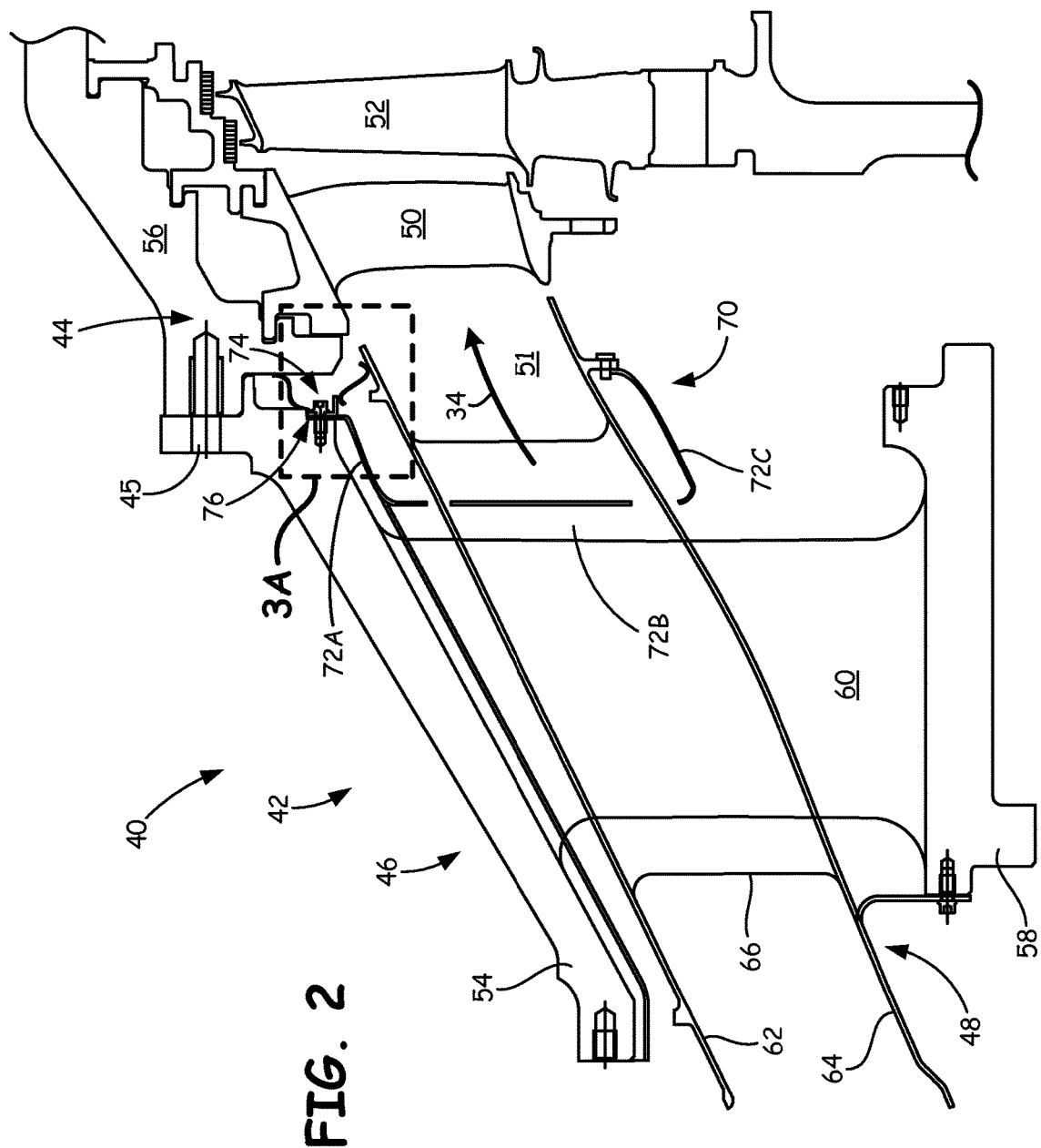
FIG. 2 shows a cross-section of an engine assembly including a first module, a second module, and a first example embodiment of a seal assembly arranged together.

FIG. 2 shows turbine assembly 40, and also includes working gas flow 34, first turbine module 42, second turbine module 44, module fasteners 45, frame 46, fairing assembly 48, stator vane 50, main gas flow passage 51, rotor blade 52, first outer case 54, second outer case 56, frame inner hub 58, frame strut 60, fairing outer platform 62, fairing inner platform 64, fairing strut liners 66, heat shield assembly 70, heat shield elements 72A, 72B, 72C, annular cavity 74, and seal assembly 76.

FIG. 2 shows turbine assembly 40 which includes first module 42 and second module 44 interconnected by fasteners 45. Gas turbine engines typically are divided into modules for ease of assembly and design. Modules such as first module 42 and second module 44 are assembled separately, and then combined together at the engine level to create various engine portions illustrated for gas turbine engine 10 of FIG. 1.

For simplicity, this particular example is described with reference to turbine exhaust case (TEC) assembly 42 being a first turbine module. However, it will be appreciated that a first module can comprise any suitable module of gas turbine engine 10 such as compressor sections 16, 18 or turbine sections 22, 24. Second module 44 can similarly be a module secured downstream of TEC assembly 42.

Among other components, TEC assembly 42 includes frame 46 and fairing assembly 48. Second module 44 additionally houses components such as stator vane 50 and rotor blade 52. TEC assembly 42 is connected to second module 44 such that modules 42 and 44 abut along respective first and second outer radial cases 54, 56. TEC assembly 42 and second module 44 are connected such that vane 50 and blade 52 are disposed downstream of frame 46 and fairing 48 with respect to direction 34 of combustion gases flowing along main engine gas flow passage 51.

In this example embodiment, frame 46 includes outer case section 54 and inner hub 58, with a plurality of circumferentially distributed struts 60 extending radially therebetween. Only one strut 60 is shown in FIG. 2. When assembled, fairing assembly 48 is secured over annular surfaces of frame 46 to define main gas flow passage 51. In this example, fairing assembly 48 includes individual fairing elements such as outer fairing platform 62, inner fairing platform 64, and strut liners 66. Outer fairing platform 62 and inner radial platform 64 each have a generally conical shape and are retained over annular surfaces of outer case 54 and inner hub 58. Inner radial platform 64 is spaced from outer radial platform 62 by strut liners 66. Strut liners 66 are adapted to be disposed over annular surfaces of struts 60, which extend radially between inner radial platform 62 and outer radial platform 60.

While fairing assembly 48 prevents direct contact of working fluid with frame 46, to provide further thermal control, heat shield assembly 70 can be disposed in a line of sight between fairing assembly 48 and frame 46. Heat shield elements 72A, 72B, 72C are secured to various parts of TEC assembly 42 so as to reduce heating of frame 46 caused by thermal radiation emitted from fairing assembly 48.

Figure 4:
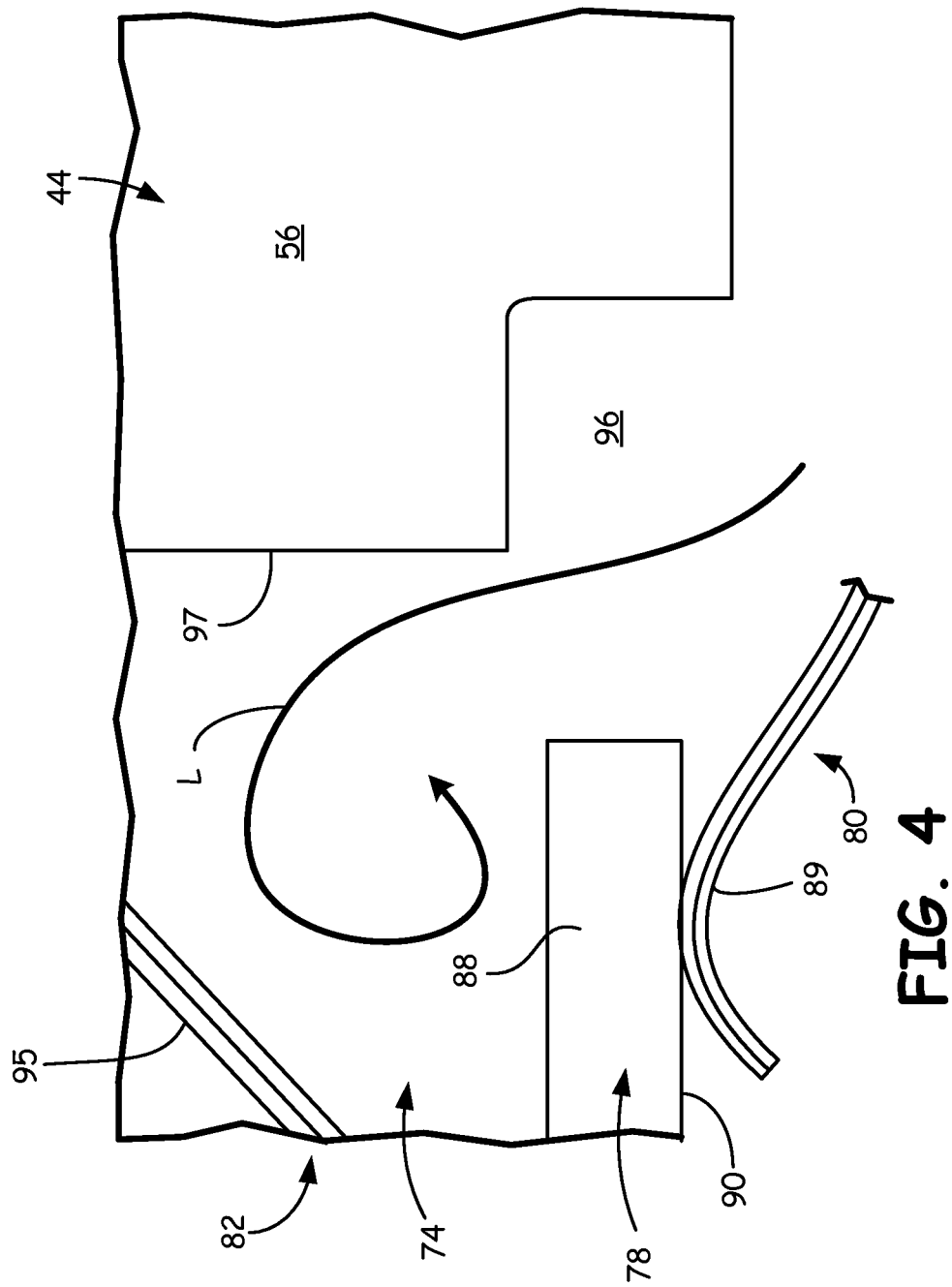
FIG. 4 is a detailed cross-section of a portion of FIG. 3A.
Figure 5:
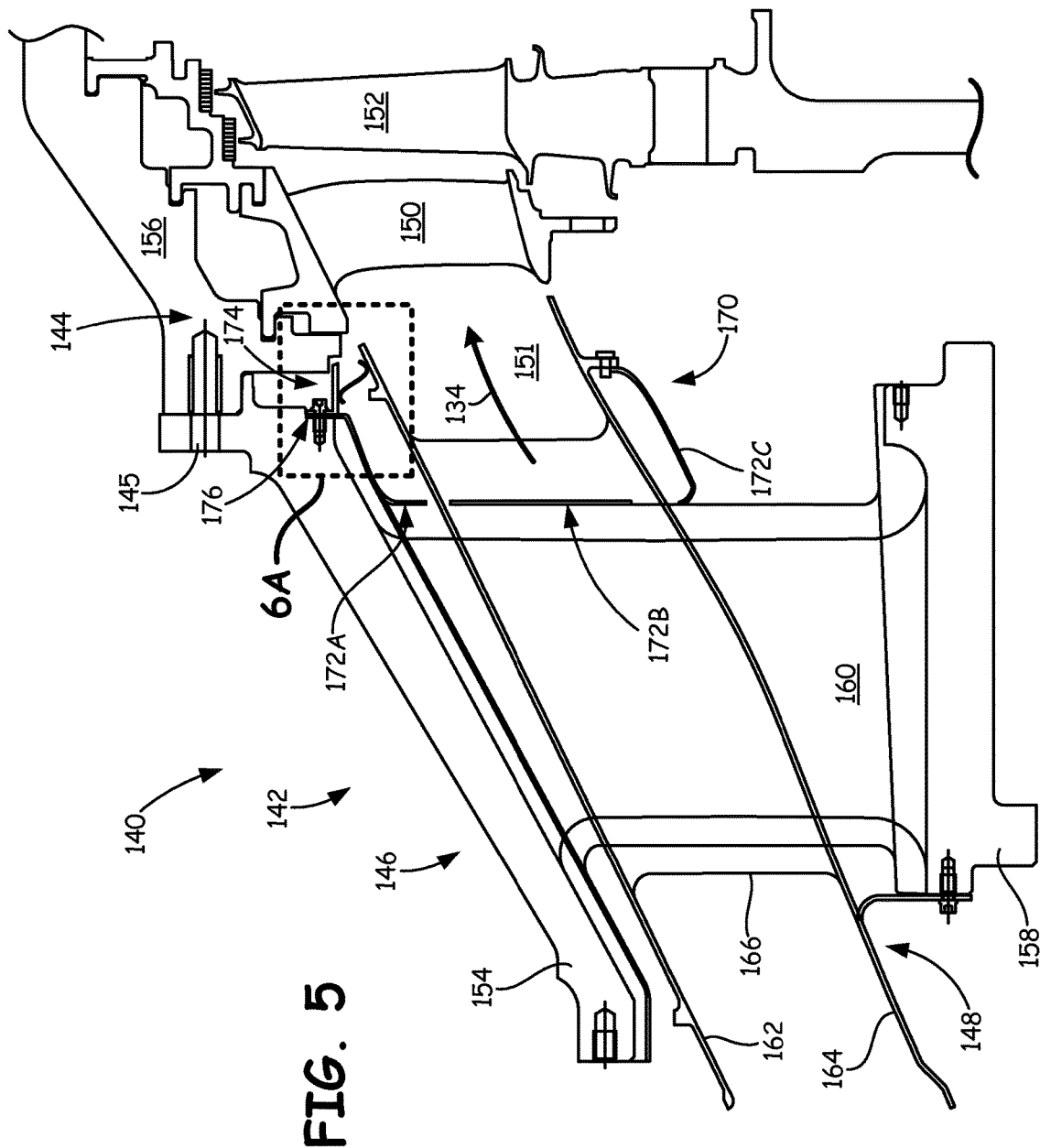
FIG. 5 shows a cross-section of an engine assembly including a first module, a second module, and a second example embodiment of a seal assembly arranged together.

Annular cavities in and around TEC assembly 42 and second module 44 can be sealed against intrusion of combustion or working gases from main gas flow passage 51. One such cavity is annular cavity 74 disposed proximate the joint between TEC assembly 42 and second module 44. One example means includes seal assembly 76 disposed proximate cavity 74, which is defined between TEC assembly 42 and second module 44. FIGS. 3-5 are detailed views of cavity 74 and seal assembly 76 disposed proximate the joint between modules 42, 44.

Figure 3A:
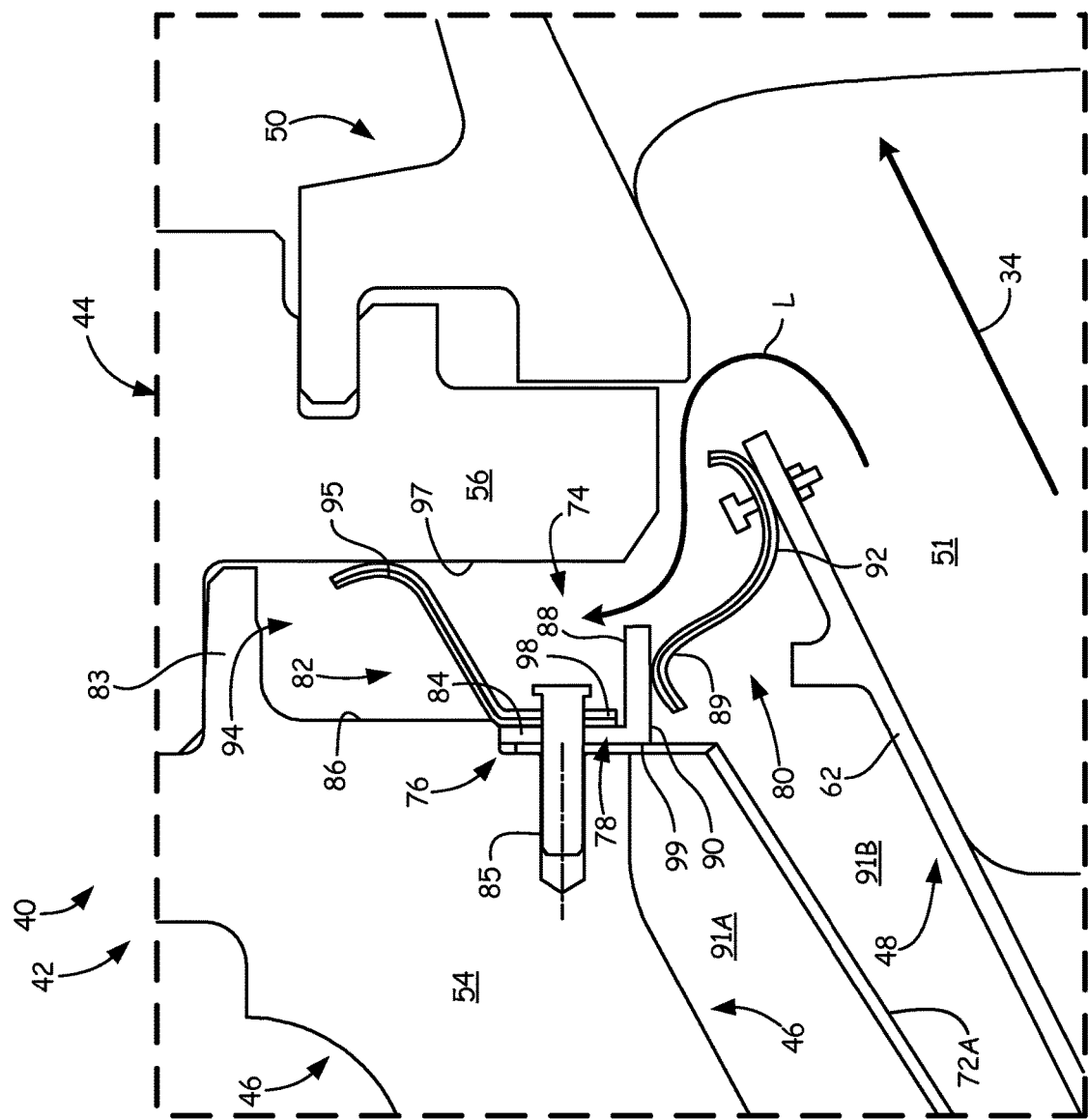
FIG. 3A is an enlarged cross-section of the portion of FIG. 2 showing the first example embodiment of the seal assembly.
Figure 3B:
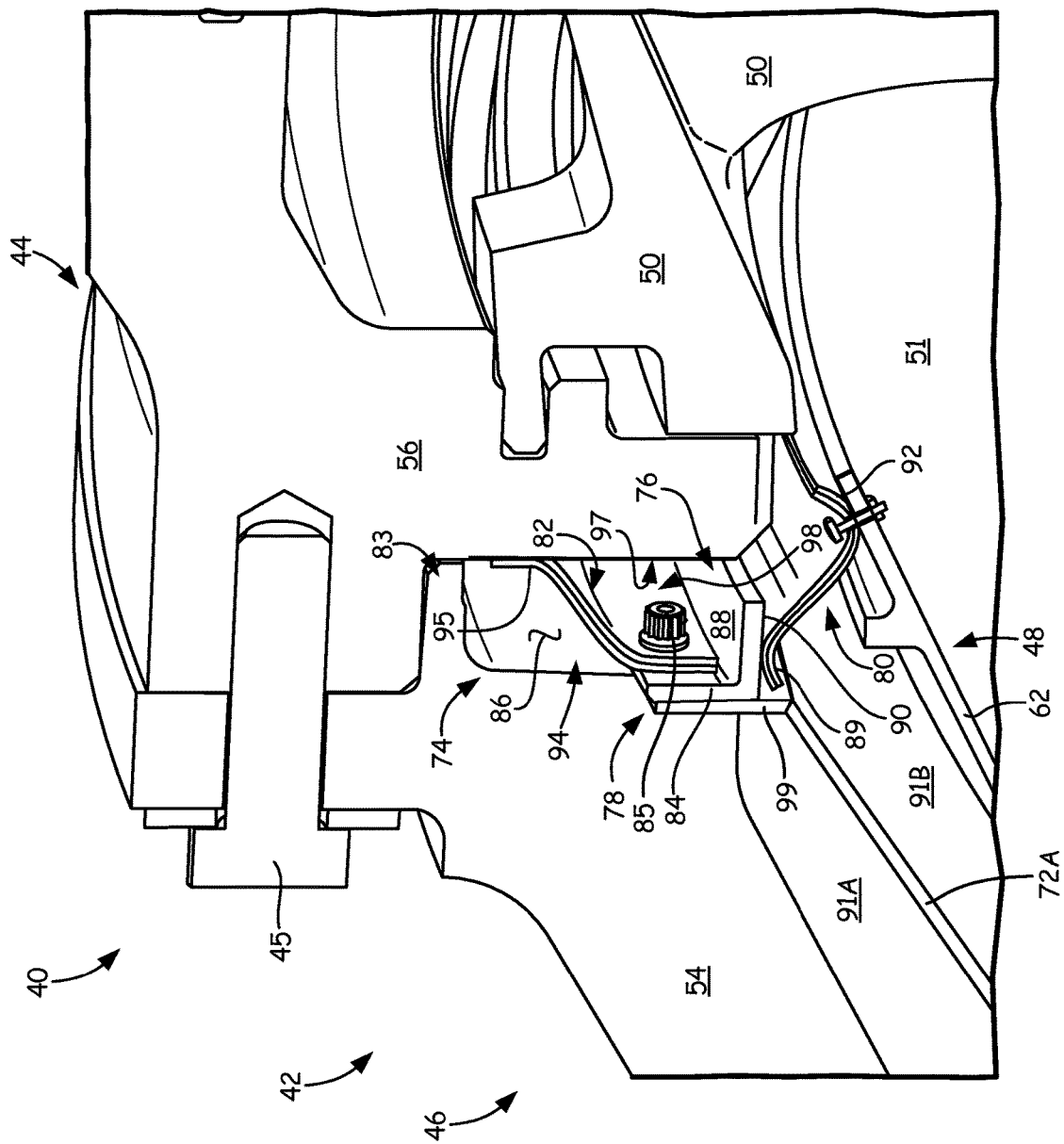
FIG. 3B isometrically depicts the first example embodiment of the seal assembly.

FIG. 3A shows a detailed sectional view of a portion of turbine assembly 40 with seal assembly 76 disposed in cavity 74, while FIG. 3B is a perspective view. FIGS. 3A and 3B also include working gas flow 34, first turbine module 42, second turbine module 44, module fasteners 45, frame 46, fairing assembly 48, stator vane 50, main gas flow passage 51, first outer case 54, second outer case 56, fairing outer platform 62, heat shield element 72A, support ring 78, first finger seal 80, second finger seal 82, snap 83, seal backing portion 84, seal ring fastener 85, fairing cavities 91A, 91B, first module radial wall surface 86, first seal land 88, first finger seal free end 89, first seal land inner side 90, first finger seal fixed end 92, annular cavity radially outer portion 94, second finger seal free end 95, second module radial wall surface 97, second finger seal fixed end 98, and heat shield fixed end 99.

As shown in FIG. 2, TEC assembly 42 includes outer case section 54 and second module 42 includes outer case section 56. In this illustrative example, TEC assembly 42 comprises a turbine module (e.g., low pressure turbine module 24 in FIG. 1) with a turbine exhaust case (TEC) assembly. Here, second module 44 comprises a power turbine module (e.g., power turbine module 26 in FIG. 1).

Seal assembly 76 includes seal support ring 78, first finger seal 80, and second finger seal 82. As shown in FIGS. 3A and 3B, outer case 54 can include snap 83 that snaps into an interference fit with a mating portion of outer case 56 along the joint between TEC assembly 42 and second module 44. As described previously, seal support ring 78 is mounted between TEC assembly 42 and second module 44 radially inward of snap 83 to support first and second finger seals 80, 82.

Cavity 74 is formed along the joint between TEC assembly 42 and second module 44 and includes outer cavity portion 94. Seal assembly 76 separates cavity 74 from fairing outer radial platform 62. Seal ring fasteners 85 are disposed within cavity 74 for mounting both seal support ring 76 and second finger seal 82 to TEC assembly 42. Together, seal support ring 76 and second finger seal 82 cooperate to reduce the total leakage airflow L escaping main gas flow passage 51, and more particularly, limits leakage flow L that is able to reach radially outer cavity portion 94.

Support ring 78 includes backing portion 84 secured to radial wall surface 86 of TEC assembly 42. First seal land 88 extends axially into cavity 74 away from TEC assembly 42. As shown in FIG. 3B, seal support ring 78 can include a single unified generally L-shaped ring. A circumference of seal support ring 78 can be similar to those of outer cases 54, 56. In other embodiments, seal support ring 78 may comprise a plurality of circumferentially distributed ring segments, and/or mounted to second module 44, rather than TEC assembly 42.

First finger seal 80 has free end 89 adapted to contact inner side 90 of first seal land 88. This redirects a substantial portion of leakage flow L away from fairing cavities 91A, 91B, and toward cavity 74 proximate an outer side of outer fairing platform 62. In certain embodiments, fixed end 92 of first finger seal 80 can be removably secured to an outer portion of fairing assembly 48 such as a flange or other projection disposed opposite the gas facing surface of outer radial platform 62.

Second finger seal 82 can be adapted to seal radially outer portion 94 of annular cavity 74 to prevent excessive heating of outer case sections 54, 56. One way outer case sections 54, 56 may be heated is through ingestion of leakage flow L from main gas flow passage 51. Second finger seal 82 helps provide further sealing of outer cavity portion 94 against ingestion of leakage flow L. In certain embodiments, free end 95 of second finger seal 82 extends partially toward second module 44. Radial wall surface 97 of second module 44 (a wall of cavity 74) is adapted to operate as a seal land for free end 95 of second finger seal 82. In certain embodiments, fixed end 98 of second finger seal 82 can be secured to support ring backing portion 84 and TEC assembly radial wall 86. In this configuration, second finger seal 82 can be disposed in cavity 74 without additional mounting hardware thereby simplifying manufacture and assembly.

In operation, leakage gas flow L may pass from main engine gas flow passage 51 aft of outer radial platform 62 and tends to flow toward a space between fairing assembly 48 and frame 46 (here, outer case 54). Seal assembly 76 operates in two stages to direct leakage gas flow L away from fairing cavities 91A, 91B, then seals outer cavity portion 94. This protects the joint between TEC assembly 42 and second module 44. First finger seal 80 reduces ingestion of leakage flow L into fairing cavities 91A, 91B between fairing assembly 48 and frame 46. Most of the leakage flow L redirected toward cavity 74 is prevented from reaching outer cavity portion 94 and snaps 83 via second finger seal 82.

Seal assembly 76 is shown and described as being disposed radially outward of main engine gas flow passage 51 and fairing assembly 48 in FIGS. 2-3B. However, in certain alternative embodiments, embodiments of seal assembly 76 can be disposed radially inward of main engine gas flow passage 51.

As described with respect to FIG. 2, seal support assembly 76 can optionally comprise heat shield 70. In certain embodiments, heat shield 70 comprises a plurality of heat shield elements 72A, 72B, 72C. Here, a portion of heat shield element 72A can be positioned or retained between TEC assembly 42A (specifically outer case section 54), and outer radial platform 62. In this example, first end 99 of heat shield element 72A can be commonly secured to TEC assembly radial wall surface 86, and to backing portion 84 of seal support ring 78 via seal ring fasteners 85. This allows controlled thermal growth of heat shield element 76 so that at least a reflective portion of element 72A is retained in a line of sight between frame 46 and fairing assembly 48.

FIG. 4 is a detailed view of FIG. 3A showing first seal land 88 extending partially toward second module radial wall surface 97. First seal land 88 of seal support ring 78 extends into cavity 74 toward second module 44. As shown in FIG. 4, seal land 88 reduces the available flow area for leakage flow to enter cavity 74. Only a portion of leakage flow L then reaches second finger seal 82, which in turn protects outer cavity portion 94 and snaps 83.

In this example embodiment, a seal support assembly is disposed proximate a joint between a first module and a second module. The seal support assembly includes a seal support ring with a backing ring mounted to a first module and a seal land extending partially across the joint toward the second module. The seal support ring includes a first seal land for a first finger seal, and the backing ring retains a fixed end of a second finger seal. The backing ring can also optionally be used to secure a fixed end of a heat shield element used to reduce radiative heating of the first module. Because the seal support assembly is a single piece, potential for installation damage is reduced or eliminated. Additionally, the seal support assembly can be easily repaired or replaced.

Referring to FIGS. 2-4, seal support ring 78 is one illustrative example of an apparatus which can simultaneously provide sealing surface for free end 89 of first finger seal 80 at a location proximate cavity 74, as well as securing second finger seal 82 at a location within cavity 74. As noted above, first finger seal 80 has a fixed seal end 92 adapted to be mounted to fairing assembly 48 passing generally axially through first gas turbine module 42. Seal support ring 78 also can include backing portion 84 for mounting ring 78 to first radial wall surface 94 of first outer case 54. First seal land 88 is also adapted to extend axially toward second outer case 56. Free end 95 of second finger seal 82 can also be adapted to prevent leakage gas flow L from entering radially outer cavity portion 94 and snap 83. Other examples of possible additions and modifications to seal support ring 78 and the surrounding region have also been described.

Figure 6A:
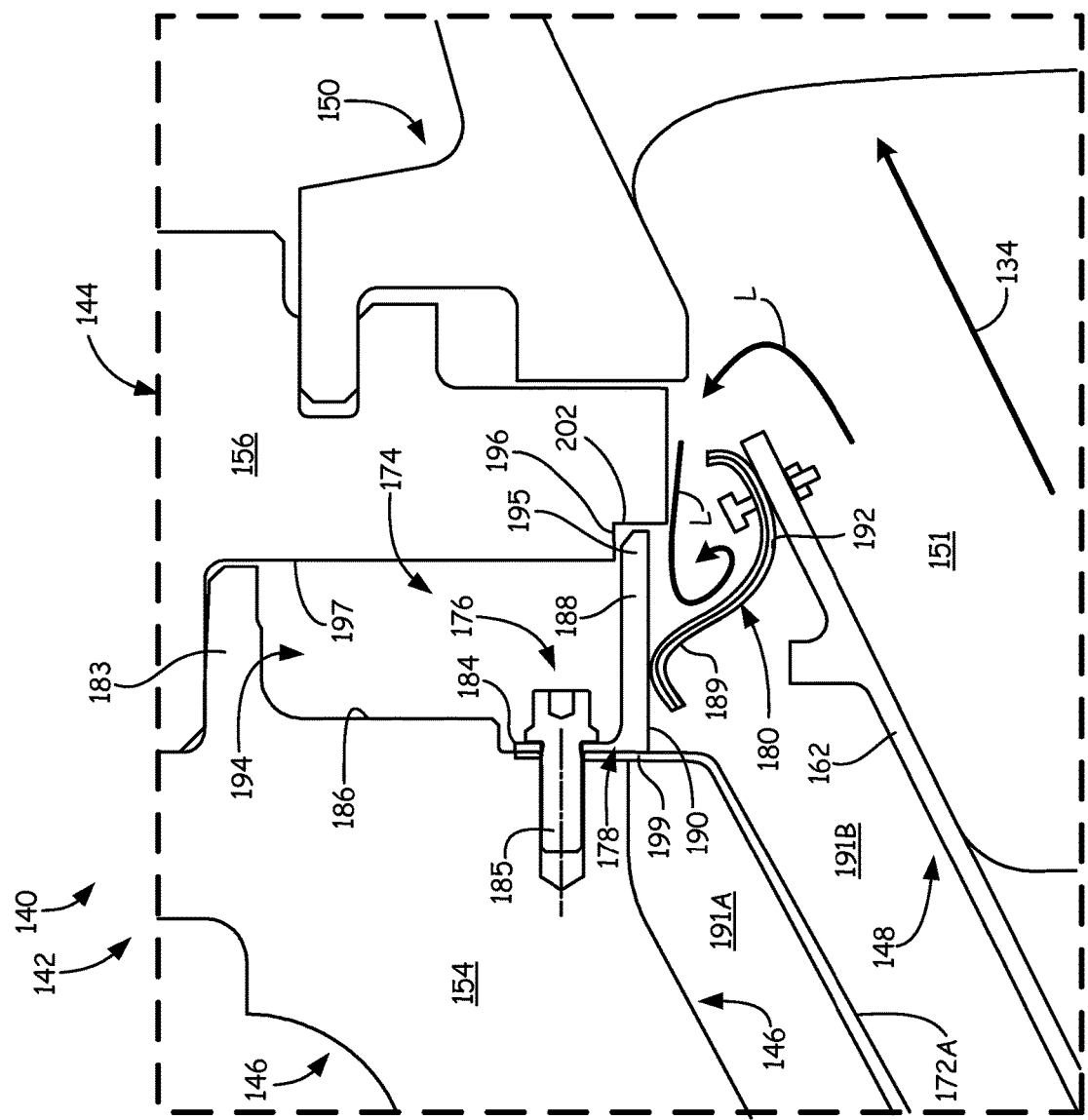
FIG. 6A shows an enlarged cross-section of the portion of FIG. 5 showing the second example embodiment of the seal assembly.
Figure 6B:
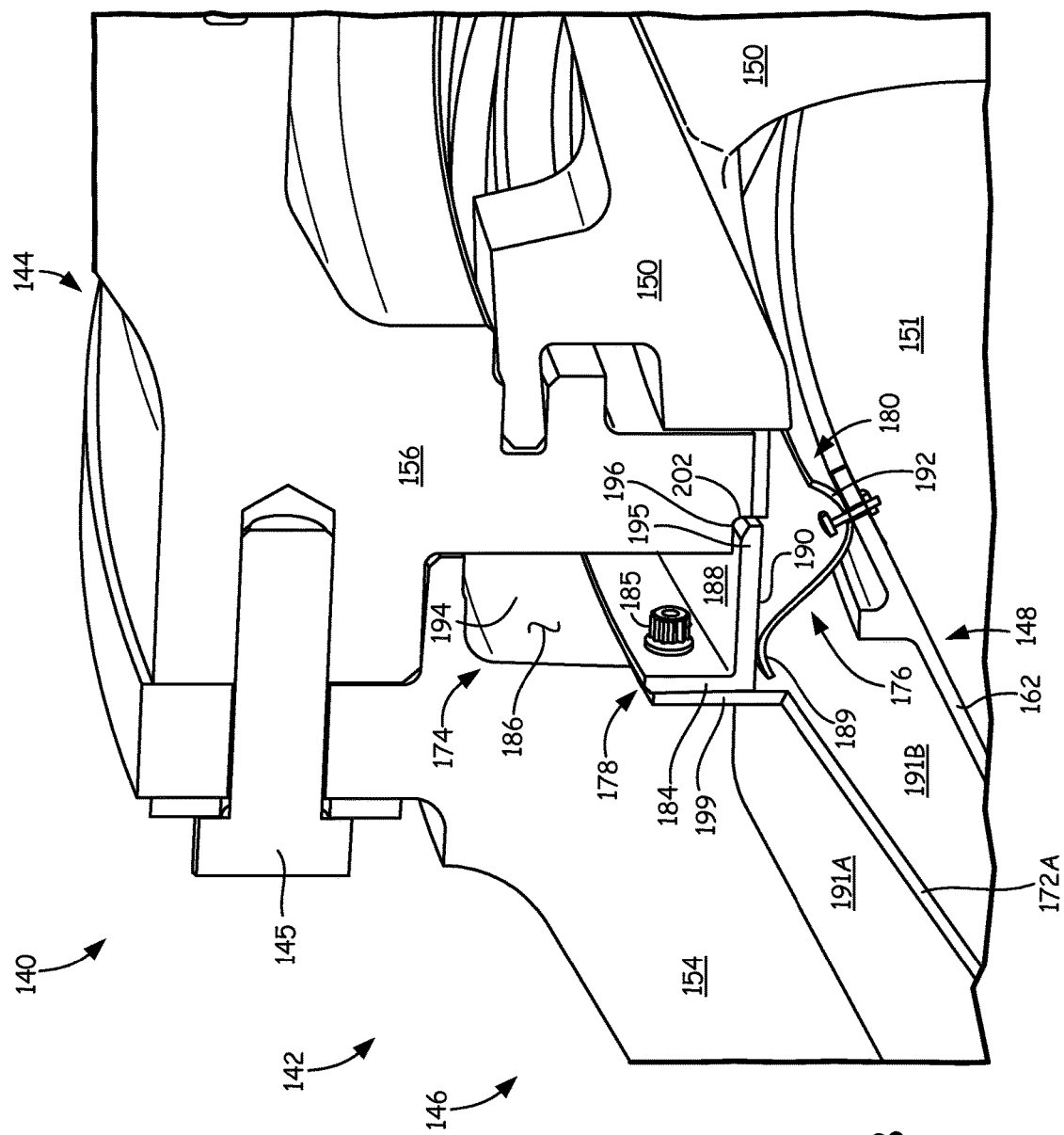
FIG. 6B is an isometric view of the second example embodiment of the seal assembly.
Figure 7:
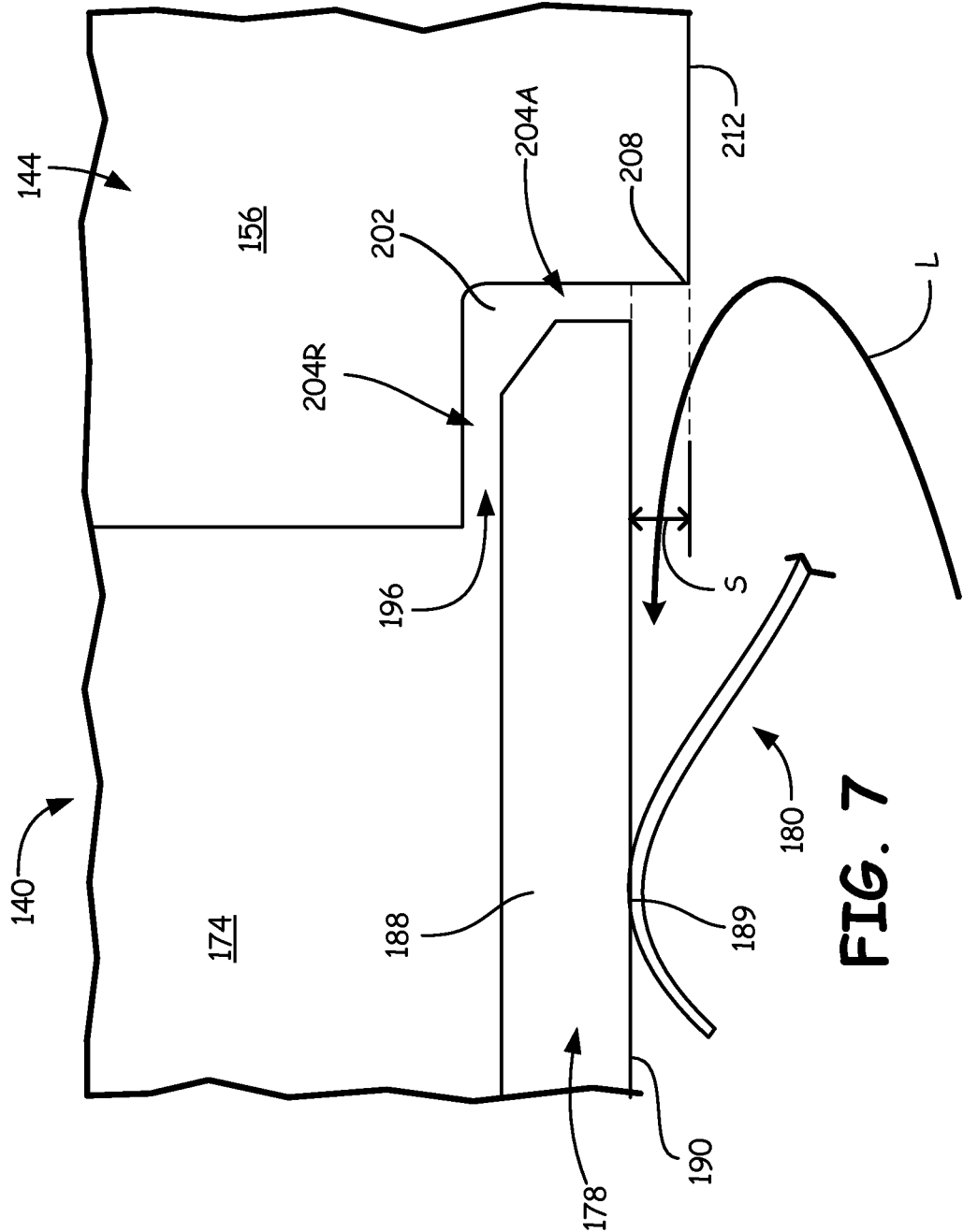
FIG. 7 is a detailed cross-section of a portion of FIG. 6A.

FIGS. 5-7 describe alternative embodiments for sealing a joint between turbine modules. FIG. 5 shows a view of assembly 140, comparable to the view of FIG. 2. FIG. 5 also shows working gas flow 134, first turbine module 142, second turbine module 144, module fasteners 145, frame 146, fairing assembly 148, stator vane 150, main gas flow passage 151, rotor blade 152, first outer case 154, second outer case 156, frame inner hub 158, frame strut 160, fairing outer platform 162, fairing inner platform 164, fairing strut liners 166, heat shield assembly 170, heat shield elements 172A, 172B, 172C, annular cavity 174, and seal assembly 176.

In this alternative embodiment, seal support assembly 176 takes the place of seal support assembly 76 proximate annular cavity 174, which is defined between TEC assembly 142 and second module 144. Similar to FIG. 2, TEC assembly 142 comprises outer case section 154 and second module 144 comprises outer case section 156. TEC assembly 142 can comprise a turbine module (e.g., low pressure turbine 24 in FIG. 1). Second module 144 can comprise a power turbine module (e.g., power turbine module 26 in FIG. 1).

FIG. 6A shows a detailed view of seal assembly 176 disposed in cavity 174, and FIG. 6B is a perspective view of seal assembly 176 disposed in cavity 174. FIGS. 6A and 6B also include working gas flow 134, first turbine module 142, second turbine module 144, module fasteners 145, frame 146, fairing assembly 148, stator vane 150, main gas flow passage 151, first outer case 154, second outer case 156, fairing outer platform 162, heat shield element 172A, seal support ring 178, first finger seal 180, snap 183, backing portion 184, radial wall surface 186, flow discourager portion 188, finger seal free end 189, flow discourager inner side 190, fairing cavities 191A, 191B, first finger seal fixed end 192, annular cavity radially outer portion 194, recess 196, second module radial wall surface 197, heat shield fixed end 199, and gap 202.

FIGS. 6A and 6B show a cross-section of assembly 140 with seal assembly 176, which can include seal support ring 178 and first finger seal 180. In addition to frame 146, fairing assembly 148, and vane 150, assembly 140 includes cavity 174, fasteners 175, and snap 183. Seal support ring 178 is mounted to TEC assembly outer case 154. Seal support ring 178 includes backing portion 184 and flow discourager arm 188. In this example, seal support ring 178 can be a combination seal support and flow discourager.

Similar to FIGS. 2-3B, backing portion 184 is secured to radial wall surface 186 of TEC assembly 142. In place of a seal land, seal support 178 includes flow discourager arm 188 which can extend axially through cavity 174 toward a recess formed in second module 144. First finger seal includes free end 189 adapted to contact inner side 190 of flow discourager arm 188 for reducing a leakage flow L entering fairing cavities 191A, 191B. Flow discourager arm 188 eliminates the need for a second finger seal by reducing and redirecting more of leakage flow L away from cavity 174.

Flow discourager arm 188 includes a flow inhibiting projection 195 distal from backing portion 184, and extending axially into recess 196 formed in outer case 156 of second module 144. Projection 195 and recess 196 define discourager gap 202 between flow discourager portion 188 and wall surfaces of recess 196. Flow discourager portion 188 is adapted to change a flow direction of leakage gas into outer portion 194 of cavity 174. As seen in FIG. 7, to create a tortuous path for leakage air L, flow discourager gap 202 can include both a generally axial portion 204A and a generally radial portion 204R with respect to engine centerline axis 12 (shown in FIG. 1). As a result of this and similar arrangements, operational wear and potential for installation damage can be reduced or eliminated.

In certain embodiments, flow discourager arm 188 is capable of operating in a range between a first thermal state and a second thermal state. Due to thermal effects of leakage flow L, flow discourager arm 188 axially expands and contracts relative to recess 196, which determines relative dimensions of discourager gap 202. In a first thermal state, a larger discourager gap 202 results from thermal contraction of arm 188. This allows purging of cavity outer portion 194 at lower engine temperatures (e.g., cold soak or idle). As flow discourager arm 188 and surrounding components are exposed to leakage flow L (or other hot working gases and combustion products), arm 188 thermally expands in an axial direction so that flow inhibiting projection 195 is in close proximity with one or more wall surfaces of recess 196. Thus in a second thermal state, this effectively reduces one or more dimensions of discourager gap 202 toward zero so that the above described tortuous path can be created, allowing discourager arm 188 and projection 195 to act as a sealing flange.

While shown as being mounted to TEC assembly 142, a flow discourager arm 188 can alternatively extend from second module 144 to interface with a recess in TEC assembly 142.

First finger seal 180 can be removably secured to fairing assembly 148 extending generally axially through TEC assembly 142, defining main gas flow passage 151. Similar to FIGS. 2-4, heat shield element 172A can include a fixed end 199 which is also removably secured to outer case 54 of TEC assembly 42. Heat shield element 172A can be commonly mounted via fixed end 199 along with support ring backing portion 184. Thus a portion of heat shield element 172A can be retained in a line of sight between frame 146 of TEC assembly 142, and fairing assembly 148 (defining main gas flow passage 151). A free end of heat shield element 172A is thus free to expand and contract within fairing cavities 191A, 191B to account for thermal growth of the surrounding fairing components.

FIG. 7 shows flow discourager portion 188 extending into recess 196 in second module outer case 156. In addition to flow discourager portion 188 and cavity 174, assembly 140 includes gap 202 with an axial portion 204A and radial portion 204R. Second outer case 156 of second module 144 includes inner radial wall surface 208.

Flow discourager portion 188 interfaces with second module 44 along gap 202. As shown in FIG. 7, gap 202 forms a tortuous path for leakage flow L seeking to enter cavity 174. Gap 202 causes leakage flow L to change direction through radial portion 204R as well as axial portion 204A with respect to centerline axis 12 of gas turbine engine 10 (shown in FIG. 1). Thus, as seen in FIG. 4, leakage flow L must change flow directions several times in order to pass through gap 202 to reach cavity 174. Inner surface 190 of flow discourager portion 188 can be radially offset from second module inner radial wall surface 212 by a distance S. In this way, leakage flow L passing over corner 208 is diverted toward discourager arm 188, and away from radial gap portion 204R.

Seal support ring 178 is one illustrative example of an apparatus which can simultaneously discourage a leakage flow from entering cavity while also supporting free end 189 of first finger seal 180 at a location proximate cavity 174. Flow discourager portion 188 extends into recess 196 to form a gap which changes direction of leakage flow L entering cavity 174. While shown as a complete ring, it will be appreciated that seal support ring can alternatively be divided into a plurality of circumferentially distributed seal support ring segments. Other examples of possible additions and modifications to seal support ring 178 and the surrounding region have also been described.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
   a first module including a first radial wall;
   a second module including a second radial wall, the second module interconnected with the first module along a joint such that a surface of the second radial wall faces a surface of the first radial wall;
   a cavity defined in part by the first radial wall and the second radial wall; and
   a seal assembly disposed proximate the cavity, the seal assembly comprising:
   a seal support ring including a backing ring portion and a flow discourager arm, the backing ring secured to one of the first radial wall and the second radial wall, and the flow discourager arm extending axially through the cavity into a recess formed in the other of the first radial wall and the second radial wall;
   a first finger seal including a fixed end and a free end, the free end contacting an inner side of the flow discourager arm; and
   a heat shield element with a fixed end fastened between the backing ring portion of the seal support ring, and the surface of the one of the first radial wall and the second radial wall.

2. The assembly of claim 1, wherein the flow discourager arm includes a distal flow inhibitor projection extending into the recess, defining a discourager gap between the flow discourager arm and a wall of the recess.

3. The assembly of claim 2, wherein the flow discourager arm is operable between a first thermal state and a second thermal state, wherein the thermal state determines a relative size of the discourager gap.

4. The assembly of claim 2, wherein the flow discourager gap comprises a generally axial portion, and a generally radial portion defined with respect to a center line axis of the gas turbine engine.

5. The assembly of claim 1, wherein a reflective portion of the heat shield element is retained in a line of sight between the first module and an outer fairing platform.

6. The assembly of claim 1, wherein the fixed end of the first finger seal is removably secured to a fairing extending through the first module.

7. The assembly of claim 1, wherein the first module comprises an outer case section and the second module comprises an outer case section.

8. The assembly of claim 1, wherein the first module comprises a turbine exhaust case assembly.

9. The assembly of claim 1, wherein the second module comprises a power turbine module.

10. A turbine assembly for a gas turbine engine, the turbine assembly comprising:
   a turbine exhaust case assembly including a first outer case section with a first radial wall;
   a second module including a second outer case section with a second radial wall, the second outer case section interconnected with the first outer case section such that a surface of the first radial wall faces a surface of the second radial wall;
   a seal support ring including a backing ring portion mounted to the first radial wall, and a discourager portion extending from the backing ring portion and into a recess formed in the second radial wall for reducing a leakage flow reaching an interconnection of the first outer case section and the second outer case section;
   a first finger seal having a fixed end and a free end, the free end contacting an inner side of the discourager portion for sealing a fairing cavity and the fixed end fastened to an outer side of a fairing disposed radially inward of the first outer case section; and
   a heat shield element with a first end fastened between the first radial wall and the backing ring portion.

11. The assembly of claim 10, wherein an upstream end of the second outer case section is fastened to a downstream end of the first outer case section.

12. The assembly of claim 10, wherein the fixed end of the first finger seal is fastened to an outer side of a fairing disposed radially inward of the first outer case section.

13. The assembly of claim 10, wherein a reflective portion of the heat shield element retained in a line of sight between the outer side of the fairing and the first outer case section.

14. The assembly of claim 10, wherein the flow discourager portion comprises a distal flow inhibitor projection extending into the recess, defining a discourager gap between the flow discourager arm and a wall of the recess, the flow discourager arm being operable between a first thermal state and a second thermal state.

15. The assembly of claim 14, wherein an inner surface of the flow discourager portion is radially offset from an inner surface of the second outer case section for directing a leakage flow away from the discourager gap.

16. A seal support for a gas turbine engine, the seal support comprising:
   means for securing the seal support to a radial wall of a gas turbine module;
   means for discouraging a leakage flow from entering a cavity defined in part by the radial wall, wherein the means for discouraging a leakage flow are arranged substantially perpendicular to the means for securing the seal support;
   wherein the means for securing the seal support also include means for securing a fixed end of a heat shield element such that a reflective portion of the heat shield element is retained in a line of sight between the gas turbine module and the outer side of a main gas flow passage extending through the gas turbine module.

17. The seal support of claim 16, wherein the discouraging means comprise a discourager arm having an inner surface adapted to support a free end of a first finger seal, the first finger seal also having a fixed end fastened to an outer side of the main gas flow passage extending through the gas turbine module.

18. The seal assembly of claim 16, wherein the means for securing the seal support comprise a seal support ring backing portion, and the means for discouraging a leakage flow comprise a flow discourager arm having a distal flow inhibiting projection.

\* \* \* \* \*